United States Patent [19]
Shimazu et al.

[11] Patent Number: 6,066,945
[45] Date of Patent: May 23, 2000

[54] METHOD AND DEVICE FOR AUTOMATICALLY SWITCHING THREE-PHASE VOLTAGE FOR POWER SAVING TRANSFORMER

[75] Inventors: Chiyuki Shimazu; Koji Yabase; Kunio Shimazu, all of Urawa, Japan

[73] Assignee: Legend Power Ltd., Tortola, Virgin Islands (Br.)

[21] Appl. No.: 09/125,720

[22] PCT Filed: May 6, 1997

[86] PCT No.: PCT/JP97/01553

§ 371 Date: Oct. 14, 1998

§ 102(e) Date: Oct. 14, 1998

[87] PCT Pub. No.: WO98/29788

PCT Pub. Date: Jul. 9, 1998

[30] Foreign Application Priority Data

Dec. 25, 1996 [JP] Japan ................................. 8-345178

[51] Int. Cl.[7] .................................................. H01F 33/00
[52] U.S. Cl. ............................................................ 323/361
[58] Field of Search ................................... 323/258, 263, 323/333, 343, 349, 361

[56] References Cited

U.S. PATENT DOCUMENTS

| | | | |
|---|---|---|---|
| 4,535,291 | 8/1985 | Lee et al. ................................. | 324/320 |
| 5,079,687 | 1/1992 | Sakisaka et al. ......................... | 363/61 |
| 5,654,627 | 8/1997 | Shimazu et al. ......................... | 323/258 |
| 5,714,821 | 2/1998 | Dittman ................................... | 310/179 |

FOREIGN PATENT DOCUMENTS

| | | | |
|---|---|---|---|
| 0164512 | 10/1982 | Japan ..................................... | 323/361 |
| 60-1819 | 1/1985 | Japan . | |
| 7-78035 | 3/1995 | Japan . | |
| 8-45752 | 2/1996 | Japan . | |
| 9-191574 | 7/1997 | Japan . | |

*Primary Examiner*—Adolf Denake Berhane
*Attorney, Agent, or Firm*—Griffin, Butler, Whisenhunt & Szipl, LLP

[57] ABSTRACT

An electric power saving transformer for three-phase current with an automatic voltage transferring device, in an autotransformer of a three-phase three-wire system or a three-phase four-wire system, has phase-winding of one set or plural sets of main coils which are connected to input terminals on a three-phase core-type core; connecting plural sets of exciting coils mutually connected in series to wind the three-phase core-type core between the ends of the main coils by means of plural combinations of connection; connecting plural electric switches between the ends of the main coils and the exciting coils which are switched to ON/OFF based on a voltage value detected at the input or output terminals; and connecting and disconnecting between the ends of the main coils and the exciting coils, by switching ON/OFF of the electric switches stepwise on the same value of voltages or currents between the phases in order to automatically change output voltage correspondingly to input voltage onto voltage transferring circuits in an uninterrupted manner.

8 Claims, 4 Drawing Sheets

METHOD AND DEVICE FOR AUTOMATICALLY SWITCHING THREE-PHASE VOLTAGE FOR POWER SAVING TRANSFORMER

BACKGROUND OF THE INVENTION

The present invention relates to a device for automatically adjusting an output voltage within a predetermined range even when an input voltage is increased or decreased beyond a predetermined range in an electric power saving device, such as an autotransformer, so that an abnormal voltage is not supplied to a load.

Japanese Patent Application No.1804/1995, which was filed prior to the present application by the same applicant, of which U.S. Pat. No. 5,654,627 is a U.S. counterpart is one of known conventional electric power saving apparatuses.

In a conventional electric power saving apparatus, as shown in FIG. 4, plural sets of exciting coils L3, L4, L7 and L8, which are wound on a single-phase core-type core (9) in a mutually connected series, are connected between the ends of plural sets of main coils L1, L2, L5 and L6 which are phase-wound on the core (9), in which the combinations of connection of the exciting coils L3, L4, L7 and L8 are controlled by thyristors (1, 2, 3, 4, 5, 6, 7, 8) connected with a voltage sensor (not shown) provided at the input ends of the main coils L2 and L6, whereby an output voltage is prevented from an unnecessary increase and decrease.

For example, a circuit, on which the exciting coils are combined to cause the voltage to output by dropping by 6V for an input voltage of 100V, is automatically changed to another circuit which has a lower-voltage rate of 3V and then 0V when the input voltage is decreased. On the other hand, the circuit will be automatically changed to another circuit which has a upper-voltage rate of 3V or 6V when the input voltage is too low. Therefore, the output voltage is prevented from unnecessarily increasing and decreasing so as to keep the effect on the load as little as possible.

However, conventional electric power saving transformers with automatic voltage changing device such as the aforementioned example are for single-phase current, and are restricted to autotransformers of single-phase three-wire or two-wire system, except for a power generator.

In the case of three-phase current, a simultaneous ON/OFF change of voltages of the three phases is desired. Since the three phases of alternating current are not at the same voltage level and simultaneous OFF is impossible for thyristors as electric switches, the control circuit is complex and difficult to manage compared with for single-phase current. Accordingly, manual voltage change has been performed conventionally instead of automatic voltage change in three-phase current.

SUMMARY OF THE INVENTION

To solve the aforementioned disadvantages, the present invention provides, as will be described in the following, a method and an apparatus having a function of automatically adjusting an output voltage within a predetermined range even when an input voltage is increased or decreased beyond a predetermined range of the voltage in an electric power saving device for three-phase current.

An electric power saving transformer for three-phase current with an automatic voltage transferring device, in an autotransformer of a three-phase three-wire system or a three-phase four-wire system, is characterized by phase-winding one set or plural sets of a main coils which are connected to input terminals on a three-phase core-type core; connecting plural sets of exciting coils mutually connected in series to wind the three-phase core-type core between the ends of the main coils by means of plural combinations of connection; connecting plural electric switches between the ends of the main coils and the exciting coils which are switched to ON/OFF based on the value detected by a voltage sensor connected to the input or output terminals; and connecting and disconnecting between the ends of the main coils and the exciting coils, by switching ON/OFF of the electric switches stepwise on the same value of voltages or currents between the phases in order to automatically change output voltage correspondingly to input voltage onto voltage transferring circuits in an uninterrupted manner.

According to the electric power saving device of the present invention, the instant the voltage sensor detects an increase or a decrease of the input voltage beyond a predetermined range. Electric switches, which receive an output signal sent from the voltage sensor, control the combinations of connection of the aforementioned plural sets of the exciting coils so as to adjust the lower-voltage rate for the input voltage value in order to be able to constantly output the voltage within the predetermined range.

Furthermore, when the output voltage does not need to be decreased, the voltage may be output at the same value as the input voltage.

Hysteresis may be provided by a difference between input voltage values in which a lower-voltage rate is changed, when the input voltage is being increased and decreased, so that an error made by the apparatus when the combinations of connection of the exciting coils are changed is prevented, and the coils and electric switches are facilitated without being overloaded.

The stepwise change of the lower-voltage rate according to the input voltage value is effective for electric power saving.

The lower-voltage rate of approximate 1% to 10% is useful.

According to the present invention as described so far, electric power is, a matter of course, saved by decreasing the output voltage to be above the minimum voltage necessary but within the predetermined range. Furthermore, the voltage is facilitated to adjust so as to automatically output the voltage value within a predetermined range, whereby the effect on a load for three-phase current, wherein voltage stability is necessary, may be minimized.

BRIEF DESCRIPTION OF THE DRAWINGS

The above and other objects, features and advantages of the present invention will be seen in reference to the following descriptions taken in connection with the accompanying drawings.

L1, L2, L5, L6, L9 and L10 each stand for main coils, and L3, L4, L7, L8, L11 and L12 each stand for exciting coils.

R, S and T each stand for input terminals, and r, s and t each stand for output terminals of a transformer. S1, S2, S3 and S4 each stand for electric switches, and C stands for a three-phase core-type core.

DETAILED DESCRIPTION OF THE PREFERRED EMBODIMENT

The present invention will be described below with reference to the drawings.

Figure 1:
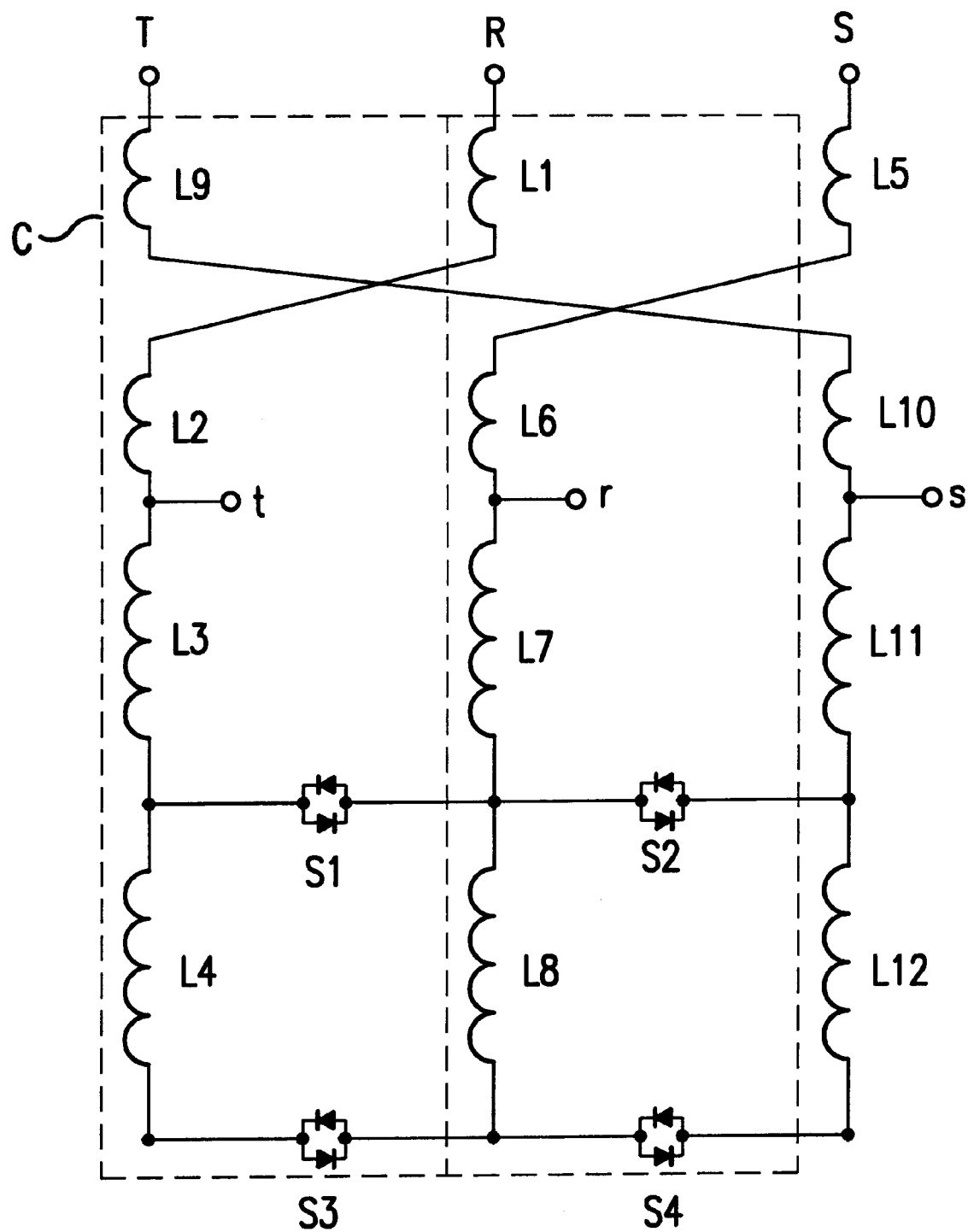
FIG. 1 is a circuit diagram of the main part of an automatic three-phase voltage transferring apparatus according to the present invention.

FIG. 1 shows a circuit diagram of the main part of an electric power saving apparatus according to the present invention, in which plural main coils L1, L2; L5, L6; and L9, L10, connected with input terminals R, S and T of the transformer respectively, are phase-wound on a three-phase core-type core (C), and a plural of sets of exciting coils L3, L7, L11 and L4, L8, L12, connected in series respectively to wind on the three-phase core-type core (C), are connected between the ends of the main coils L2, L6 and L10 by plural combined connections. Further, an output terminal t of the transformer is connected between the main coil L2 and the exciting coil L3, and the other output terminals r and s are connected between the main coil L6 and the exciting coil L7 and between the main coil L10 and the exciting coil L11 respectively.

A voltage sensor (not shown) for detecting the input voltage is designed in a base plate (not shown), in which the terminal on the probe side is connected to the output terminals of the main coils L2, L6, and L10, and the other terminal on the signal output side is connected to electric switches S1, S2, S3 and S4 designed respectively between the exciting coils.

As shown in FIG. 1, the aforementioned electric switches S1, S2, S3 and S4 are respectively connected between exciting coils; the electric switch S1 being connected between the exciting coils L3, L7, L4 and L8, the electric switch S2 being connected between the exciting coils L7, L11, L8 and L12, the electric switch S3 being connected between the exciting coils L4 and L8, and the electric switch S4 being connected between the exciting coils L8 and L12.

The electric switches are switched to ON/OFF by a voltage value detected by the voltage sensor, to control the combinations of connection of the exciting coils L3, L4, L7, L8, L11 and L12 in the circuit, with the result that the output voltage is automatically adjusted.

The function and effect of the present invention is explained below with reference to FIG. 2 which illustrates the relation between input voltage and output voltage.

In this embodiment, coils are designed to cause voltage to drop at 4V(2%) or 8V(4%) for an input voltage at 200V under the condition that the predetermined lower voltage rate is defined as 2% and 4%, and the minimum voltage value necessary for a load is defined as 192V.

In this case, the circuit is initially connected to make the output voltage drop by 8V from the input voltage, and the input voltage is going to decrease. More specifically, in the circuit diagram of FIG. 1, by the control signal detected by the voltage sensor designed in the base plate, the electric switches S1 and S2 are switched to an ON state, and the other electric switches S3 and S4 are switched to an OFF state.

Here, for example, when an input voltage of 210V is loaded, the main coils L1, L2; L5, L6; and L9, L10 are respectively dropped by 8V by the exciting coils L3, L7 and L11. Therefore, the voltage of 210−8=202 (V) is output from each output terminals r, s and t. As shown in FIG. 2, this lower-voltage circuit is used just before the input voltage reaches 200V, in which case the voltage drops below 192V when the input voltage is dropped by 8V.

When an input voltage reaches 200V, the circuit is changed to another circuit which drops by 4V in order to prevent dropping the voltage unnecessarily. The electric switches S3 and S4 are ON, and the other electric switches S1 and S2 are OFF in the circuit. The main coils L1, L2; L5, L6; and L9, L10 are respectively dropped by 4V by the exciting coils L3, L7 and L11. Therefore, the voltage of 200−4=196 (V) is output from each output terminals r, s and t. As shown in FIG. 2, this lower-voltage circuit is used just before the input voltage reaches 196V, in which case the voltage drops below 192V when the input voltage is dropped by 4V.

When the input voltage reaches 192V, the circuit is changed to another circuit, directly connecting input terminals R, S and T to output terminals r, s and t in order to prevent dropping the voltage unnecessarily.

Moreover hysteresis is provided in changing the combinations of connection of the exciting coils so that errors made by the apparatus judging the change of input voltage by an instantaneous voltage owing to a fluctuation of the input voltage or the like are eliminated, and thus an unnecessary load on the electric switches and coils is prevented.

Figure 2:
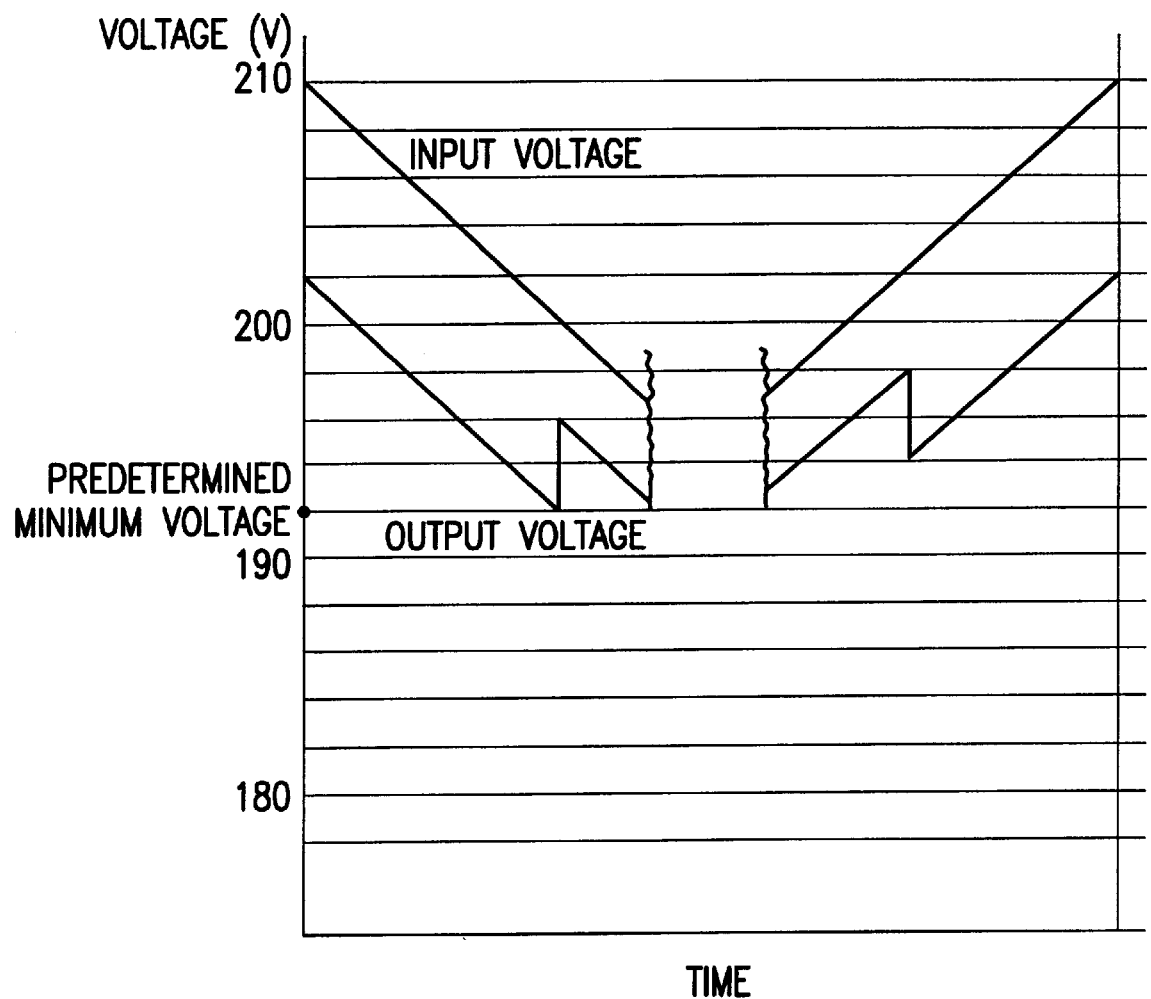
FIG. 2 is a graph showing the relation between input voltage and output voltage by the apparatus according to the present invention.

As shown in FIG. 2, the predetermined input voltage value for changing lower-voltage rate is different between decreasing and increasing of the input voltage. The circuit for 4V dropping is changed to that for 8V dropping at 202V of the input voltage when it is increasing.

As seen, the apparatus according to the present invention adjusts the output voltage by means of the above circuit structure, and since it is for three-phase current, timing of switching ON/OFF of the electric switches is important.

Figure 3:
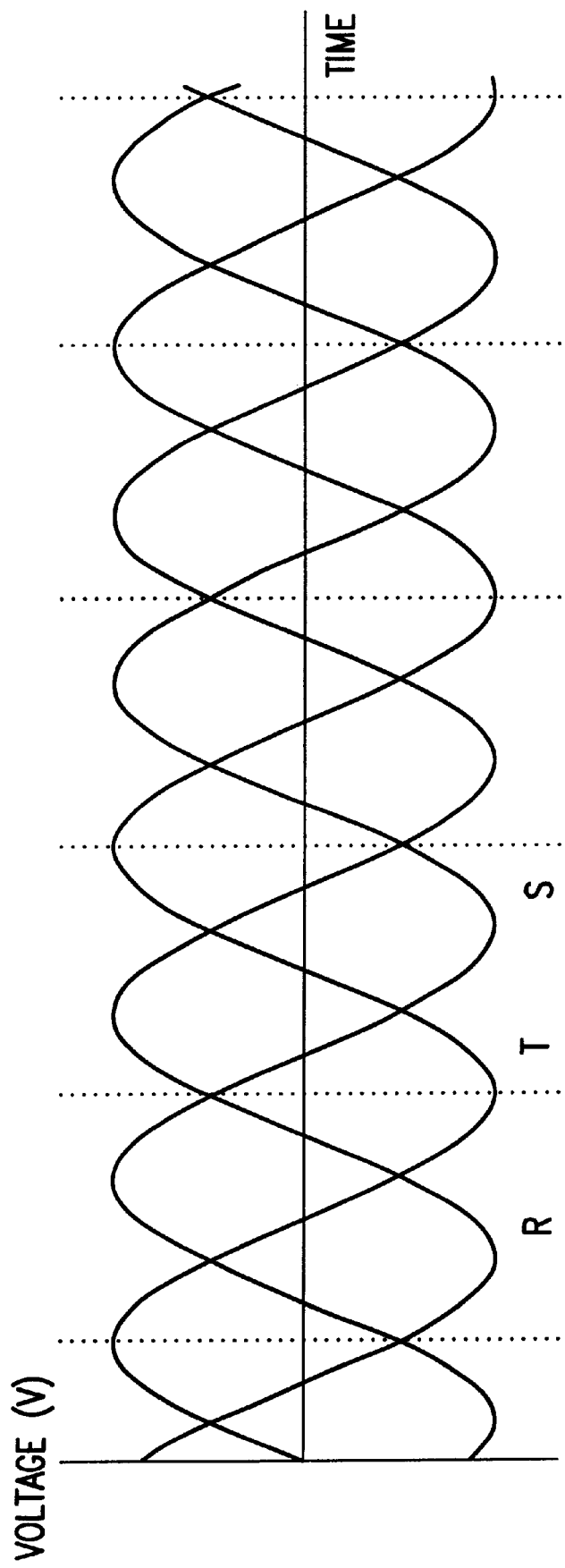
FIG. 3 graphically profiles a three-phase current.
Figure 4:
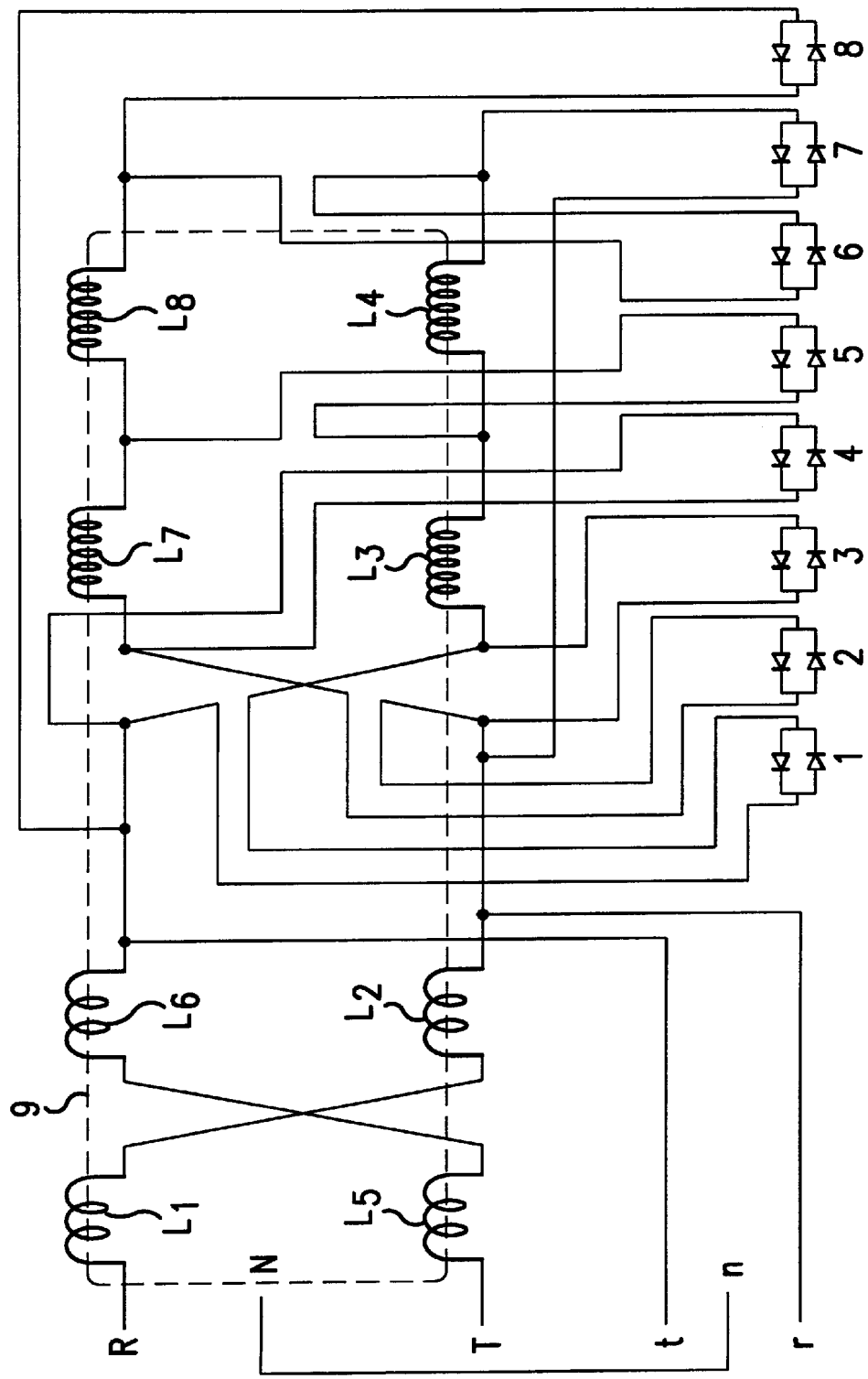
FIG. 4 is a circuit diagram of the main part of an automatic voltage transferring apparatus according to conventional skills.

Specifically, because each phase is placed with an angle of 120 degrees as shown in FIG. 3, the three phases are never of the same electric level or the same electric current. Moreover, in electric switches like thyristors, the three phases may be turned ON at the same time but cannot be turned OFF at the same time. In switching ON/OFF of each phase, the exciting coils become short circuit or disconnected for a period of one-third or two-thirds of the cycle, resulting in that it is impossible to change the voltage in each single phase.

Therefore, because there is a time when two phases are of the same electric level or the same electric current as shown in FIG. 3, the present invention switches operate on this time.

Namely, when the lower-voltage rate is 8V, electric switches S1 and S2 are ON, and S3 and S4 are OFF. As the lower-voltage rate is changed to 4V, S1 is switched from ON to OFF and S3 is switched from OFF to ON when phase T and phase R are of the same electric level or the same electric current. In one third of the cycle till phase R and phase S become of the same electric level or the same electric current, S2 is kept ON and S4 is kept OFF. Next, the moment phase R and phase S become of the same electric level or the same electric current, S2 is switched from ON to OFF and S4 is switched from OFF to ON.

Like this, voltage adjustment in three-phase current is made possible by operating the switches in two steps, and thus an electric power saving apparatus is designed.

Since the electric switches are switched stepwise, there may happen an instantaneous unbalance of voltage in phases according to a feature of an electric switch. However the unbalance is really for a short time so that security is fully provided.

The electric power saving transformer for three-phase current with an automatic voltage transferring device according to the present invention can control the combinations of connection of the plural sets of exciting coils stepwise on the same electric level or electric current of two phases with electric switches between the ends of main coils and exciting coils which are switched to ON/OFF based on the input or output voltage detected by a voltage sensor. Accordingly, when an input or output voltage decreases or increases so that it is no longer within the predetermined voltage range, the circuit is automatically changed to keep the output voltage higher than the predetermined minimum voltage value for a load.

Moreover hysteresis may be provided in changing the combinations of connection of the exciting coils so that errors made by the apparatus judging the change of input voltage by an instantaneous voltage owing to a fluctuation of the input voltage or the like are eliminated, and thus an unnecessary load on the electric switches and coils is prevented.

The predetermined lower-voltage rate in the above embodiment is defined as 2% (4V) and 4% (8V) for an input voltage of 200V, however, it can be optionally modified in value and in number of steps, and further, although the minimum voltage value for a load has been defined as 192V, the minimum voltage value for a load can be optionally modified by a switch (not shown) provided in the apparatus.

While the invention has been particularly shown and described with reference to the preferred embodiment, it will be understood by those skilled in the art that the foregoing and other changes in form and details can be made without departing from the spirit and scope of the present invention.

What is claimed is:

1. A method of changing three-phase voltage in an electric power saving transformer of a three-phase three-wire system or a three-phase four-wire system, comprising the steps of:

phase-winding one set or plural sets of main coils which are connected to input terminals on a three-phase core-type core in the transformer;

connecting plural sets of exciting coils, mutually connected in series, to wind the core between ends of the main coils by means of plural combinations of connection;

connecting plural electric switches between the ends of the main coils and the exciting coils which are switched to ON/OFF based on a voltage value at the input or at output terminals of the transformer; and connecting and disconnecting between the ends of the main coils and the exciting coils by switching ON/OFF of the electric switches stepwise on a same value of voltages or currents between the phases in order to automatically change an output voltage correspondingly with an input voltage in an uninterrupted manner.

2. The method of changing three-phase voltage according to claim 1, further comprising a hysteresis provided by a difference between the input voltage values in which a lower-voltage rate is changed when the input voltage is being increased and decreased.

3. The method of changing three-phase voltage according to claim 2, wherein the lower-voltage rate is changed in plural steps.

4. The method of changing three-phase voltage according to claim 3, wherein the lower-voltage rate is approximately 1% to 10%.

5. An electric power saving transformer of a three-phase three-wire system or a three-phase four-wire system for three-phase current, comprising:

one set or plural sets of main coils which are connected to input terminals to phase-wind on a three-phase core-type core in the transformer;

plural sets of exciting coils, mutually connected in series, to wind the core between ends of the main coils by means of plural combinations of connection;

plural electric switches between the ends of the main coils and the exciting coils which are switched to ON/OFF based on a voltage value at the input or at output terminals of the transformer so that by connecting and disconnecting between the ends of the main coils and the exciting coils by switching ON/OFF of the electric switches stepwise on a same value of voltages or currents between the phases an output voltage corresponding to an input voltage is automatically changed in an uninterrupted manner.

6. The electric power saving transformer according to claim 5, further comprising a hysteresis provided by difference between the input voltage values in which a lower-voltage rate is changed when the input voltage is being increased and decreased.

7. The electric power saving transformer according to claim 5, wherein the lower-voltage rate is changed in plural steps.

8. The electric power saving transformer according to claim 5, wherein the lower-voltage rate is approximately 1% to 10%.

* * * * *